United States Patent
Khouri et al.

(10) Patent No.: US 8,645,430 B2
(45) Date of Patent: Feb. 4, 2014

(54) SELF-ADJUSTING EMAIL SUBJECT AND EMAIL SUBJECT HISTORY

(75) Inventors: Joseph Khouri, San Jose, CA (US); Sanjeev Kumar, Sunnyvale, CA (US); Laurent Philonenko, San Francisco, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 895 days.

(21) Appl. No.: 12/254,305

(22) Filed: Oct. 20, 2008

(65) Prior Publication Data

US 2010/0100370 A1 Apr. 22, 2010

(51) Int. Cl.
*G06F 17/30* (2006.01)
*G06F 15/16* (2006.01)

(52) U.S. Cl.
USPC .......................................... 707/802; 709/206

(58) Field of Classification Search
None
See application file for complete search history.

(56) References Cited

U.S. PATENT DOCUMENTS

| | | | |
|---|---|---|---|
| 7,373,607 B2 | 5/2008 | Daniell | |
| 2003/0074409 A1* | 4/2003 | Bentley | 709/206 |
| 2003/0154254 A1* | 8/2003 | Awasthi | 709/206 |
| 2004/0080534 A1* | 4/2004 | Quach | 345/751 |
| 2007/0174396 A1 | 7/2007 | Kumar et al. | |
| 2007/0219958 A1* | 9/2007 | Park et al. | 707/3 |
| 2008/0082410 A1* | 4/2008 | Zhou et al. | 705/14 |
| 2009/0055498 A1* | 2/2009 | Brown | 709/207 |
| 2009/0106650 A1* | 4/2009 | Haynes et al. | 715/255 |
| 2009/0193406 A1* | 7/2009 | Williams | 717/168 |
| 2009/0234779 A1* | 9/2009 | Drucker et al. | 705/400 |

OTHER PUBLICATIONS

Gabor Cselle; BuzzTrack: Topic Detection and Tracking in Email; 8 pages; IUI '07, Jan. 28-31, 2007, Honolulu, Hawaii, USA.
The 1999 Topic Detection and Tracking (TDT3) Task Definition and Evaluation Plan; 14 pages; version 2.7, Aug. 10, 1999.

* cited by examiner

*Primary Examiner* — Tarek Chbouki
(74) *Attorney, Agent, or Firm* — Tucker Ellis LLP

(57) ABSTRACT

In one embodiment, an apparatus for automated generation of subject line content for e-mail messages includes an input operable to receive content data including text-based information corresponding to a body of an e-mail message, a text analyzer including logic operable to analyze received content data, a topic extractor including logic operable to extract topic data in accordance with an output of the text analyzer, a string generator including logic operable to generate subject line data in accordance with an output of the topic extractor, and a message output operable to output a multi-field e-mail message having a body field inclusive of the content data and a subject line field inclusive of generated subject line data.

20 Claims, 11 Drawing Sheets

SELF-ADJUSTING EMAIL SUBJECT AND EMAIL SUBJECT HISTORY

TECHNICAL FIELD

The present disclosure relates generally to maintenance and tracking of header information in electronic messages to more accurately reflect the topics contained in bodies of those messages and for providing a subject history in one or more threads of the messages.

BACKGROUND

Modern unified messaging and email systems such as Unity™ available from Cisco and Outlook™ available from Microsoft, for example, enable users to generate, receive, and send electronic messages to other users associated with a common or shared network. These messages typically include a body portion containing the substantive information and a header portion containing non-substantive information as to the underlying message text, including routing information such as intended recipient "To" information, sender "From" information, and a general description of the topic "Subject" of the body portion. They often evolve into message threads whenever the recipient of an original message either replies to the original message or forwards it to one or more other users of the system. The vast majority of electronic messages in most electronic messaging systems are part of one or more message threads. Many message threads include input content contributions from a large number of users made during the lifetime of the thread. The input may include contributions of content spanning a wide variety of topics not necessarily related to the topic of the original message used to start the thread. The ability to inject new topics into message threads is useful as message threads evolve over time and across multiple users.

One problem, however, is that many users fail to update or otherwise modify the email subject when the topic changes or shifts as the message thread evolves over time. In general, the topic data in the "Subject" portion of the header information in modern unified messaging and email systems is essentially static and is configured to be set manually by the users. However, some users are reluctant to change the subject information generated by the originating user who created the first message, and other users simply ignore or never think about the header information as it relates to the topic of the content in the body portion of the electronic message. Also, in some cases, the originating user who creates the first message may forget to fill the Subject portions of the header with any information, resulting in a message thread initiation without any hint of a topic contained in the messages. This unchanged subject line, of course frustrates its main function which is to provide a convenient mechanism for users to preview the contents of their respective electronic mail message boxes without opening each message individually to look at its contents. Some recipients of the thread may ignore reading certain messages based on the topic stated in the unchanged/static subject line because the topic is not of interest to them. In reality, however, one or more topics of interest to them may have been introduced into the thread previously but without a corresponding update to the topic information in the subject field of the header information. Also, static Subject header information in a message thread with dynamic topics makes searching for and locating old messages difficult.

BRIEF DESCRIPTION OF THE DRAWINGS

The accompanying drawings incorporated herein and forming a part of the specification illustrate example embodiments and, together with the description, serve to explain the principles of the embodiments.

OVERVIEW OF EXAMPLE EMBODIMENTS

Figure 1:
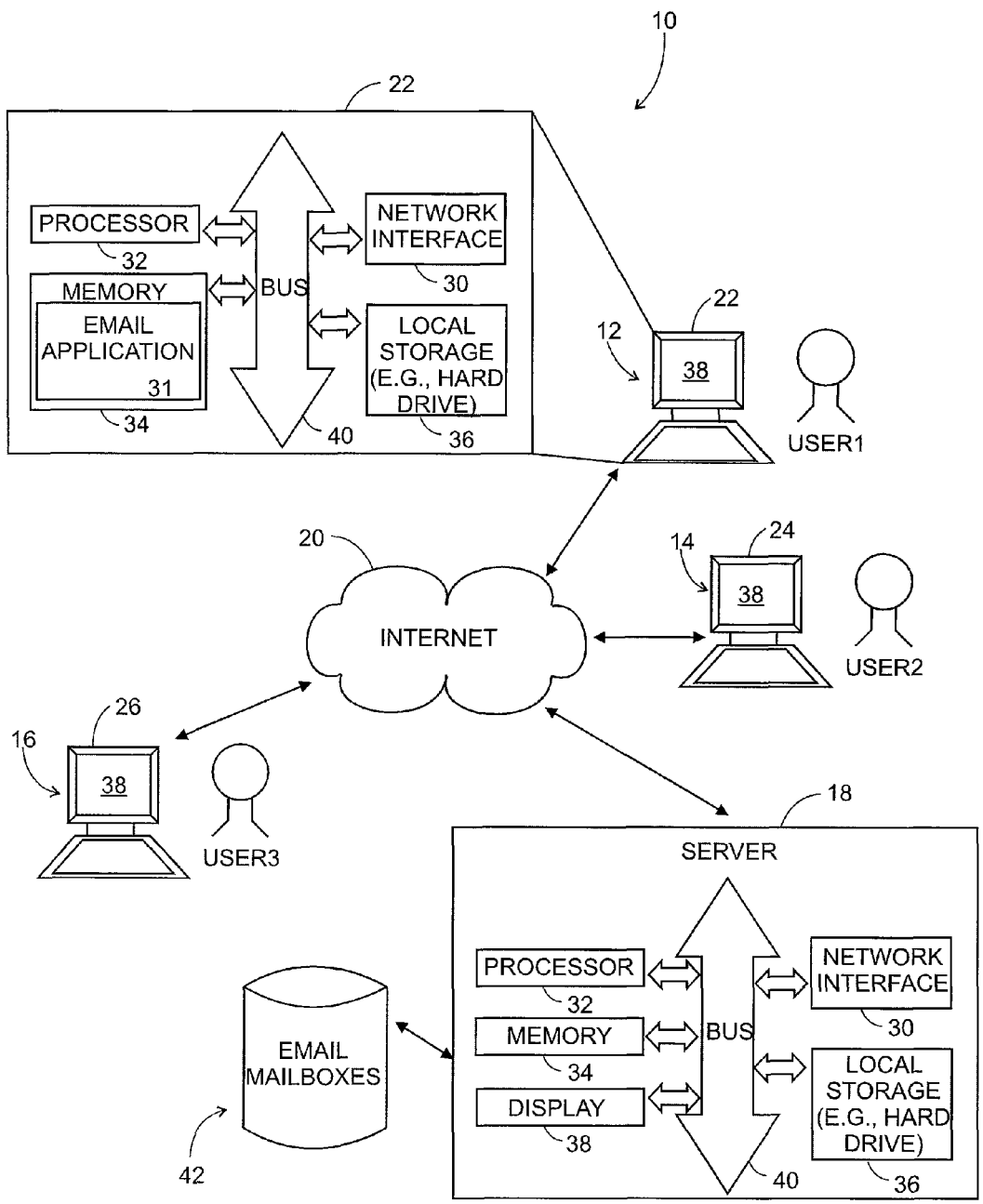
FIG. 1 is a simplified block diagram illustrating entities and components in an apparatus configured in accordance with an example embodiment.

The following presents a simplified summary of the example embodiments in order to provide a basic understanding of some aspects of the example embodiments. This summary is not an extensive overview of the example embodiments. It is intended to neither identify key or critical elements nor to delineate the scope of the embodiments. Its sole purpose is to present some concepts of the example embodiments in a simplified form as a prelude to the more detailed description that is presented later.

In accordance with an example embodiment, an apparatus for automated generation of subject line content for e-mail messages is provided. The apparatus includes an input operable to receive content data including text-based information corresponding to a body of an e-mail message; a text analyzer including logic operable to analyze received content data; a topic extractor including logic operable to extract topic data in accordance with an output of the text analyzer; a string generator including logic operable to generate subject line data in accordance with an output of the topic extractor; and a message output operable to output a multi-field e-mail message having a body field inclusive of the content data and a subject line field inclusive of generated subject line data.

In accordance with another example embodiment, a method for automated generation of subject line content for e-mail messages is provided. The method comprises receiving content data including text-based information corresponding to a body of an e-mail message; analyzing means adapted for analyzing received content data; extracting topic data in accordance with an output of the analyzing step; generating subject line data in accordance with an output of the extraction step; and outputting a multi-field e-mail message having a body field inclusive of the content data and a subject line field inclusive of generated subject line data.

In accordance with a further example embodiment, a system for automated generation of subject line content for e-mail messages is provided. The system comprises means adapted for receiving content data including text-based information corresponding to a body of an e-mail message; analyzing means adapted for analyzing received content data; extraction means adapted for extracting topic data in accordance with an output of the analyzing means; generator means adapted for generating subject line data in accordance with an output of the extraction means; and means adapted for outputting a multi-field e-mail message having a body field inclusive of the content data and a subject line field inclusive of generated subject line data.

In accordance with yet a further example embodiment, logic encoded in one or more tangible non-transient medium is provided for execution for automated generation of subject line content for e-mail messages. When executed the logic is operable to: receive content data including text-based information corresponding to a body of an e-mail message; analyze the received content data; extract topic data in accordance with an output of the analyzing step; generate subject line data in accordance with an output of the extraction step; and output a multi-field e-mail message having a body field inclusive of the content data and a subject line field inclusive of generated subject line data.

There are shown and described herein several embodiments simply by way of illustration of at least one of the modes best suited to carry out an example embodiment. As it will be realized, different embodiments are possible, and several details are capable of modifications in various obvious aspects. Accordingly the drawings and descriptions herein are to be regarded as illustrative in nature and not as restrictive.

DESCRIPTION OF EXAMPLE EMBODIMENTS

This description provides example embodiments not intended to limit the scope of the claims. The figures generally indicate the features of the example embodiments, where it is to be understood and appreciated that like reference numerals are used to refer to like elements.

FIG. 1 shows a simplified block diagram of entities and components in an electronic messaging system 10 to provide maintenance and tracking of header information in electronic messages in accordance with the example embodiments, particularly to perform topic detection, email subject adjustment, and email subject history collection functions. In the example embodiment illustrated, User1 is a first human user at a processing device, such as client computer 12. User2 and User3 are second and third human users at respective processing devices, such as second and third client computers 14, 16. The system 10 further includes a server 18 and a network 20 operatively connected with the sever 18 and with the client computers 12, 14, 16. In general, the network 20 may be the Internet, a local area network (LAN), a wireless network, a Unified Messaging System (UMS), or any other network type now known in the art or hereinafter developed.

It is to be noted that any type of suitable devices may be used as the client computers 12, 14, 16 to perform the topic detection, email subject adjustment, and email subject history collection functions of the example embodiments described below. For example, a cell phone, personal digital assistant (PDA), portable computer, etc. may be used. More than one device may be used where text is presented on a first device, such as on a computer running an Internet browser, and voice is captured in a second device, such as a cell phone. Further, the processing functions may be performed by one or more devices. For example, the topic detection and topic extraction features of FIG. 1 and described in greater detail below may be performed by client computers 12, 14, 16 or by a processor at the network 20 or by one or more processors in other locations. In general, any functionality described herein may be performed by any one or more processing devices as desired. Further, portions of the functionality may be performed at different points in time (e.g., batch mode), substantially instantaneously (e.g., real time), in one or more geographical locations, and by any present or future processing techniques.

In the operating environment shown in FIG. 1, User1, User2, and User3 use the client computers 12, 14, 16, respectively, to generate information such as email messages, chat messages, instant messages, documents, etc. In other embodiments, different user devices may be substituted for the client computers. In general, however, any device that may produce text information may be used. Devices that perform speech recognition and produce text as an output may also be used. In general, "text" as used in this application is intended to include any type of symbolic representation of a language. Alphanumeric characters, symbols, graphics, characters from different languages, etc., are included within the meaning of "text." In addition, it is to be appreciated that although only three (3) users are illustrated, the electronic messaging system 10 may include hundreds, thousands, or more client computers and users.

When User1 authors a text message for transmission through the network 20 to an intended recipient, such as for example User2, the client computer 12 detects one or more topics of the message and selectively provides an adjustment of header information of the email message, preferably in the "Subject" field of the header information. The topic detection may be selectively provided at the same time the message is to be sent, such as when User1 clicks "Send" at the client computer 12; before message transmission, such as during composition of the message at the client computer 12; or after message transmission, such as when User2 receives or opens the message at the client computer 14. Topic detection may include topic extraction by a topic extractor and string generation by a string generator generating subject line data based on the extracted topic. In one example embodiment, as will be explained below in greater detail, the adjusted subject in the message header portion provides one or more links to the email message, and in another example embodiment a subject history table is created with indicia of topics of messages comprising a message thread, each of the indicia providing one or more links to email messages within the thread. The history table may be a part of the header "Subject" field or may be an additional component of the electronic message.

As shown in FIG. 1, the client computers 12, 14, 16 include workstations 22, 24, 26 and, although the details of only a single workstation 22 are shown, each of the workstations 22, 24, 26 includes a network interface 30, a processor 32, a memory 34, a local storage device 36, a human readable display 38, and a bus 40 that permits communication between the various components within the workstation. The network interface 30 is configured to provide an interface for each of the workstations 22, 24, 26 to receive any data that may be entering from the network 20 and also to transmit any data from each of the workstations 22, 24, 26 to the network 20. Specifically, in one example embodiment, the network interface 30 is configured to permit communication between each of the workstations 22, 24, 26 and the server 18 and additionally to permit communication between the workstations 22, 24, 26 themselves. In this regard, the network interface 30 may be a modem, a network card, or any other system, device or logic that interfaces each of the workstations 22, 24, 26 to the network. Since various network interfaces are known in the art, further discussion of these components is omitted here.

In addition, in the example embodiment, the local storage device 36 may be a hard drive configured to electronically store data. The local storage device 36 may also store computer programs that execute on the workstations 22, 24, 26. In this sense, the processor 32 is configured to access any one or more programs that are stored on the local storage device 36 and to execute the one or more programs with the assistance of the memory 34. In the embodiment of FIG. 1, an email application 31 is shown as being loaded into memory 34 for launching at the workstations 22, 24, 26, thereby permitting the workstations 22, 24, 26 to send and receive email messages through the network 20. It is to be understood that various aspects of the email application 31 may be conventional or may be custom tailored to specific needs. Since the general functioning of computing devices is well known in the art, further discussion of the processor 32, the memory 34, the local storage device 36, the display 38, and the bus 40 are omitted here.

Similar to the workstations, the server 18 may also include a network interface 30, a processor 32, a memory 34, a local hard drive 36, and a display 38, which are in communication with each other over a local bus 40. Since the components 30, 32, 34, 36, 38, and 40 at the server 18 perform largely similar functions as the corresponding components at the workstations 22, 24, 26, further discussion of the server-side components is omitted here. The server in the embodiment illustrated is associated with an email mailbox store 42 configured to store messages sent within the system 10 and for selective retrieval by the various client computers as desired.

Figure 2:
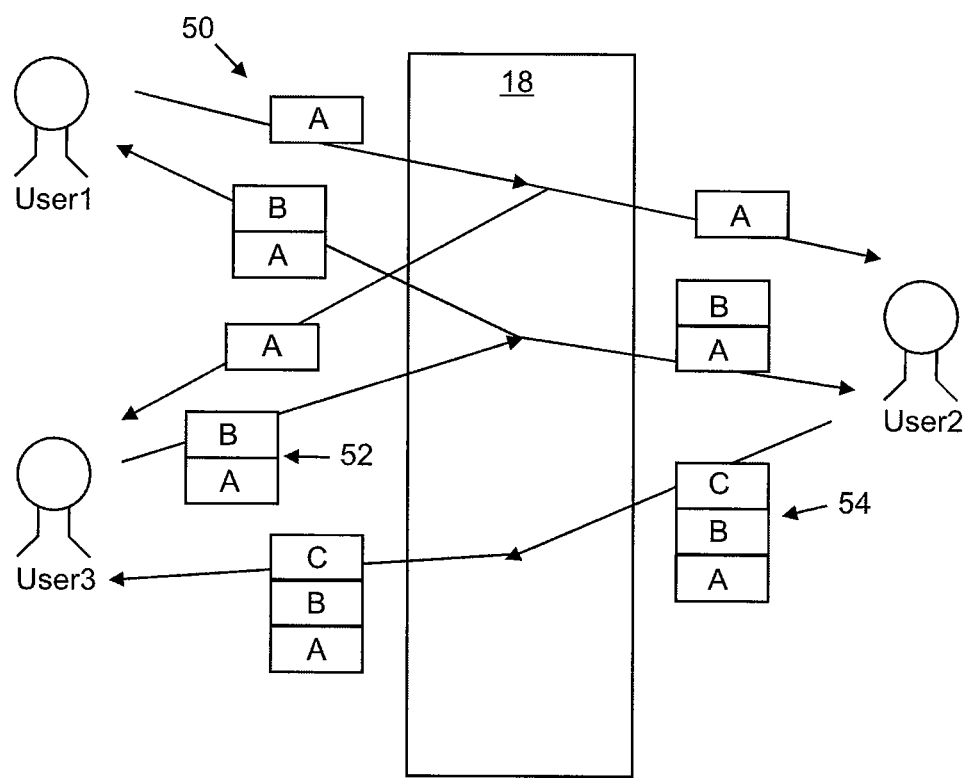
FIG. 2 illustrates generation of an email message thread having multiple authors and multiple parts.

FIG. 2 illustrates generation of an email thread having multiple authors and multiple parts. User1 composes and sends an initial email 50 with part A to User2 and to User3. Next, User3 responds to User1's email (and also copies User2) by adding part B to create reply email message 52 that includes a thread with two parts, namely part A from the initial email message and part B from the two different authors User1 and User3, respectively. Finally in the Figure, User2 adds part C to the email thread in a reply message 54 and sends it to User3. The reply email message 54 includes a thread with three (3) parts, namely part A from the initial email message 50 from author User1, a part B from the first reply email message 52 from author User2, and lastly the reply part C from the author User3.

At each transfer of an email message that builds the initial message A and the threads AB and ABC, each of the workstations 22, 24, 26 or the email server 18 (alternatively, a UMS or other type of communication server or device) selectively determines one or more topics of the email message and selectively inserts the determined one or more topics as information into the header portion of the email message, preferably into the "Subject" field of the header. Thus, the topic characteristics associated with each message A, B, and C are transferred by server 18 with each email message transfer. The one or more topics selectively inserted into the header portion may include one or more links to email messages within a conversation thread.

Figure 3:
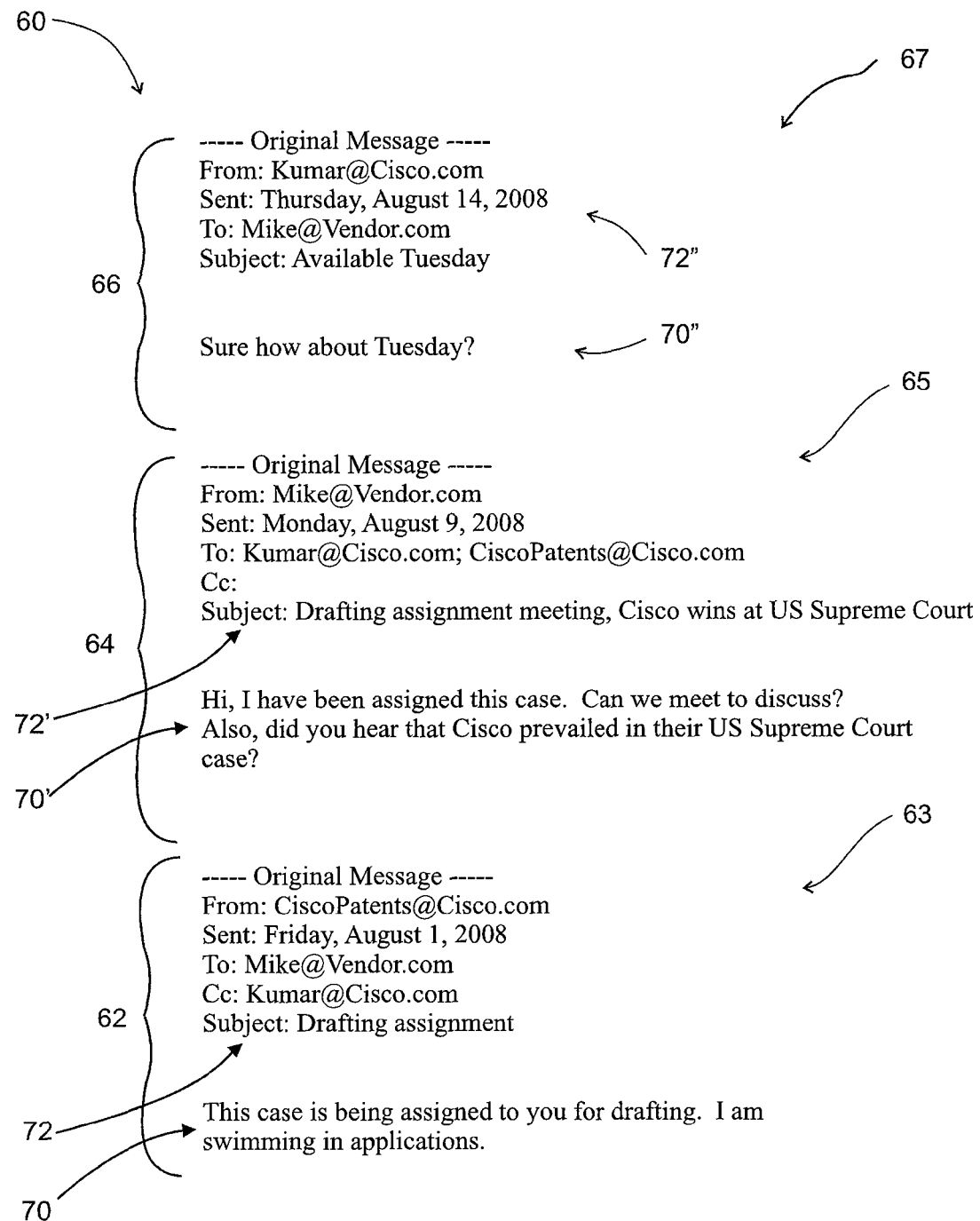
FIG. 3 shows an email message thread as it might be displayed on a traditional device.

FIG. 3 shows email message thread 60 as created in accordance with an example embodiment and including a three-part thread as it would typically be displayed on a traditional device, such as in an email program or browser window of a computer display. Each part is a prior email message that has been incorporated into the email message thread 60. Part 62 includes a first email message 63 corresponding to part A of FIG. 2, part 64 includes a second email message 65 corresponding to part B, and part 66 includes a third email message 67 corresponding to part C. Each email message 63, 65, 67 underlying the email thread 60 includes a body portion 70 including content information such as, for example, text and a header portion 72 including subject information. The header portion 72 may also list other standard information such as the sender, receiver and CC (if any) of the part, and the date received or sent. In other embodiments, the standard header information need not be included and only the "Subject" information included or, if other standard header information is included, the amount and type of information in the header may vary from the examples herein. As illustrated, the first, second, and third email messages 63, 65, 67 include body portions 70, 70', 70", respectively, and similarly include header portions 72, 72', 72", respectively.

Figure 4:
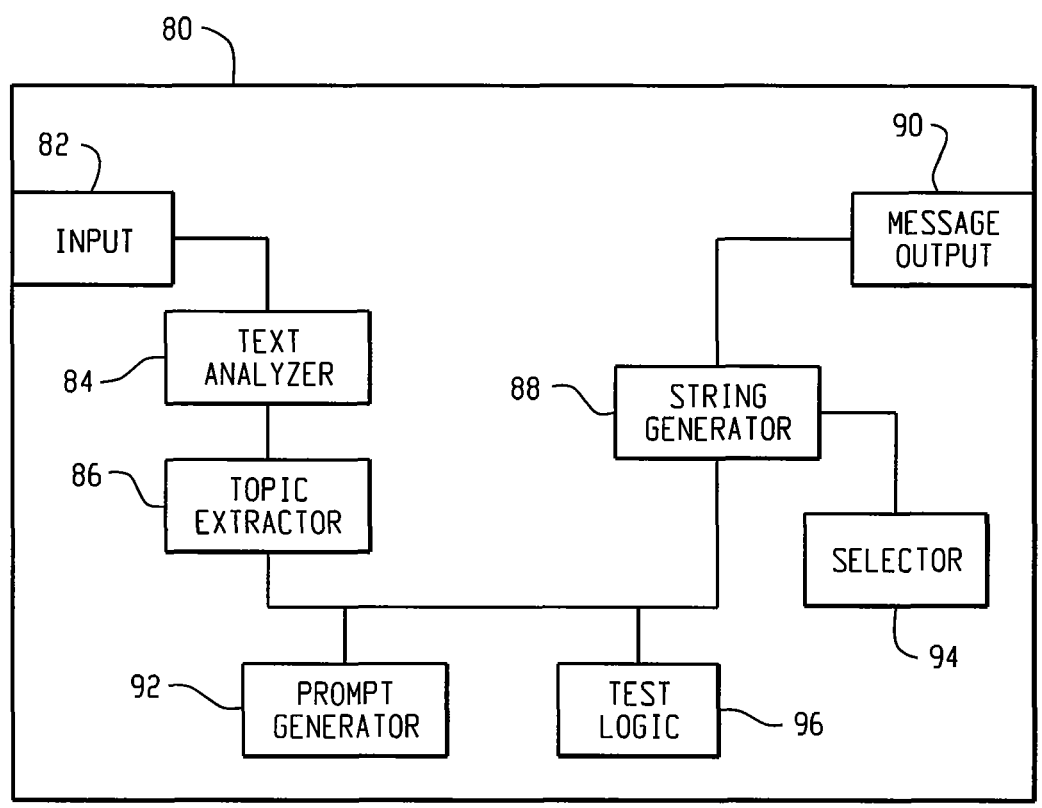
FIG. 4 is a more detailed simplified functional block diagram illustrating entities and components in an apparatus configured in accordance with an example embodiment.
Figure 5A:
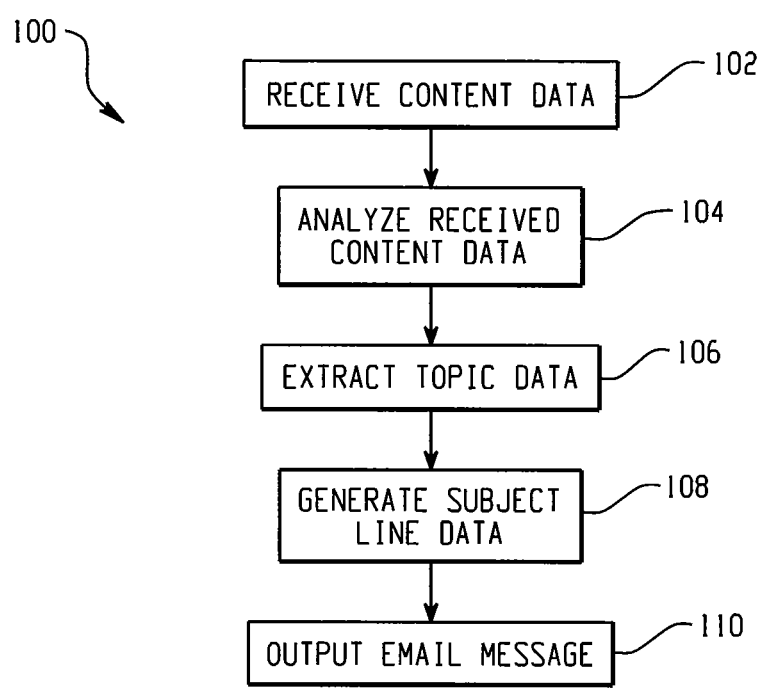
FIGS. 5A-5C are flow diagrams illustrating steps executed by the entities and components of the apparatus shown in FIGS. 1 and 4.
Figure 5B:
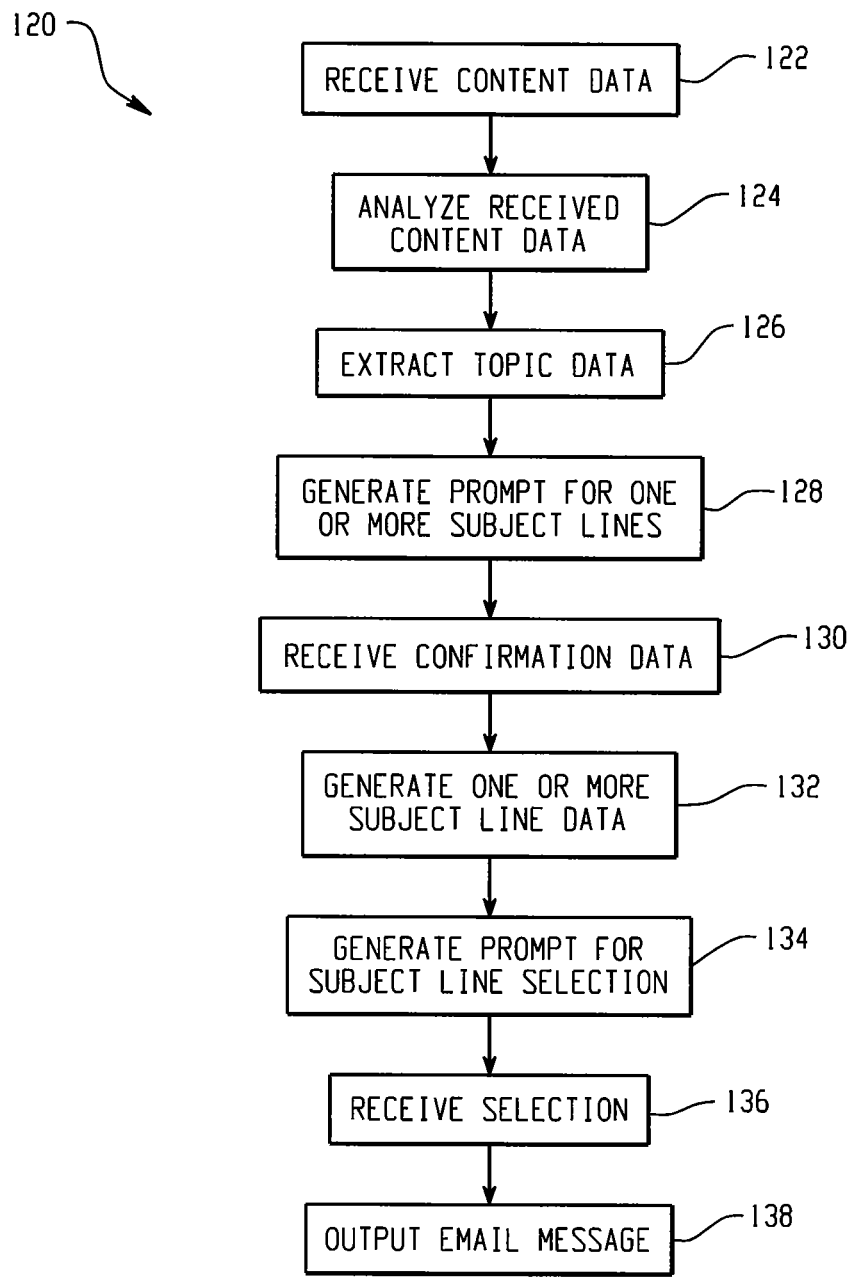
Figure 5C:
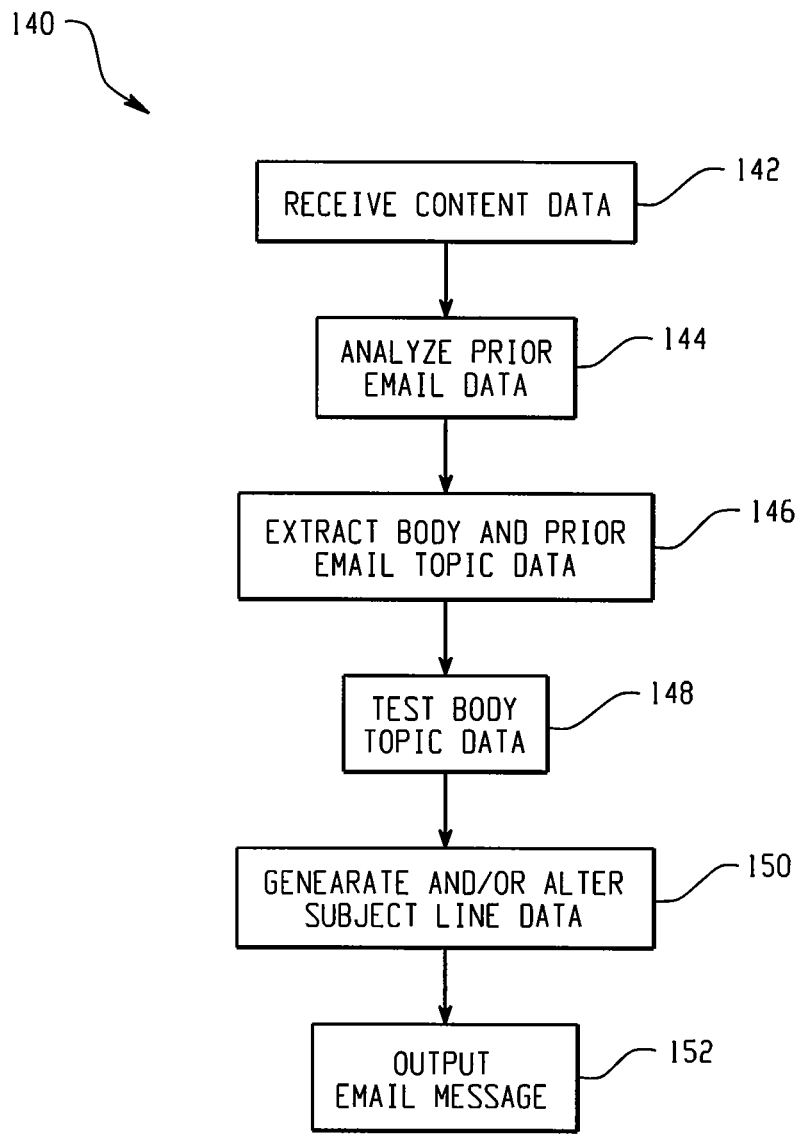

FIG. 4 illustrates a simplified functional block diagram of an apparatus 80 of an example embodiment for apparatus for automated generation of subject line content for e-mail messages, and FIGS. 5A-5C are a flow diagrams illustrating operational steps of methods 100, 120, 140 of example embodiments for automated generation of subject line content for e-mail messages. As illustrated in FIG. 4, the apparatus 80 is in the form of logic executable by the workstations 22, 24, 26 to perform the methods of FIGS. 5A-5C, but it is to be appreciated that any form of hardware and/or software combined with hardware may be used. As an example, apparatus 80 may be in the form of logic within the email application 31 and executable by the email application in the workstations 22, 24, 26 to perform the method of FIGS. 5A-5C. Further, it is to be appreciated that the logic may be distributed amongst one or more memories of the workstations 22, 24, 26 and server 18, or it may be resident in the network or at the workstation.

"Logic", as used herein, includes but is not limited to hardware, firmware, software together with hardware or firmware, and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. In addition, the term "tangible medium" for execution as used herein refers to any medium that participates in providing instructions to a processor for execution. Such a medium may take many forms, including but not limited to non-volatile media and volatile media. Non-volatile media include for example optical or magnetic disks, such as storage devices. Volatile media include dynamic memory for example and common forms of tangible media include for example floppy disk, flexible disk, hard disk, magnetic cards, paper tape, any other physical medium with patterns of holes, a RAM, a PROM, an EPROM, a FLASHPROM, any other memory chip or cartridge, or any other medium but not transient carrier waves from which a computer can read. It is to be appreciated that the apparatus 80 shown is illustrated with separate functional blocks only for purposes of describing example embodiments and that the apparatus is not limited to the particular functional blocks shown and, further, one or more of the functions may be performed by one or more of the blocks illustrated.

With reference first to FIGS. 4 and 5A, an apparatus 80 for automated generation of subject line content for e-mail messages includes an input 82 operable to receive 102 content data including text-based information corresponding to a body 70, 70', 70" of an e-mail message 63, 65, 67. A text analyzer 84 includes logic operable to analyze 104 the received content data. A topic extractor 86 includes logic operable to extract 106 topic data in accordance with an output of the text analyzer 84. A string generator 88 includes logic operable to generate 108 subject line data in accordance with an output of the topic extractor 86. A message output 90 is operable to output a multi-field e-mail message having a body field inclusive of the content data received at the input 82 and a subject line field inclusive of generated subject line data.

With reference next to FIGS. 4 and 5B, a user select option is included in a further example embodiment for providing a human user of the system 80 with a user-selectable items that are configured to toggle between one or more designations. In the example embodiment, a prompt generator 92 is operable to generate 128 a prompt inclusive of the extracted topic data to an associated user. A selector 94 is operable to receive 130, from the associated user, confirmation data corresponding to acceptability of the extracted topic data. The string generator 88 includes logic operable to generate 132 the subject line data in accordance with received confirmation data 94a. The string generator 88 may further include logic operable to generate 132 a plurality of alternative subject lines in accordance with the output of the topic extractor 86. In a further example embodiment, the prompt generator 92 is operable to generate 134 a prompt inclusive of data corresponding to each of the plurality of alternative subject lines. The selector 94 is further operable to receive 136 from the associate user, selection data corresponding to a selected one of the alternative subject lines. The string generator 88 further includes logic operable to generate the subject line data in accordance with received selection data and output 138 an email message including the subject line data.

With reference next to FIGS. 4 and 5C, the email message may be a reply message or a string of reply and/or forwarding messages. That is, the content data received at the input 82 may include prior e-mail data corresponding to at least one but, more likely, several prior e-mails. In the example embodiment, the text analyzer 84 includes logic operable to analyze 144 the prior e-mail data. In addition, the topic extractor 86 further includes logic operable to extract 146 body topic data corresponding to the e-mail body and prior e-mail topic data corresponding to the at least one prior e-mail. Test logic 96 is operable to test 148 the body topic data relative to prior e-mail topic data. The test logic may be operable to determine relatedness between the residual subject information and the one or more reply topics of the reply email message. The string generator 88 is further inclusive of logic to alter 150 the subject line data in accordance with an output of the test logic 96. In one example embodiment, the altered subject line data includes link data corresponding to the at least one prior e-mail.

That is, the apparatus 80 shown in the example embodiment in FIG. 4 is configured to associate determined topics with links to the underlying email messages corresponding to the topics. The apparatus comprises an input 82 operable to receive 102 content data including text-based information corresponding to a body of an e-mail message, a text analyzer 84 operable to analyze the received content data, a topic extractor operable to extract topic data in accordance with an output of the text analyzer 84, a string generator operable to generate subject line data in accordance with an output of the topic extractor 86, and a message output operable to output a multi-field e-mail message having a body field inclusive of the content data received at the input and a subject line field inclusive of generated subject line data. The determined topics are associated with email messages whereby a selection of any of the email links by a user of the email messaging system links the user with the email message corresponding to the selected email link. In other words, in one example embodiment, the system is configured to display, when a user "clicks" an email topic link in the header portion of the email thread, the single email message or the multiple email messages of the thread corresponding to the selected topic on display 38.

Figure 6A:
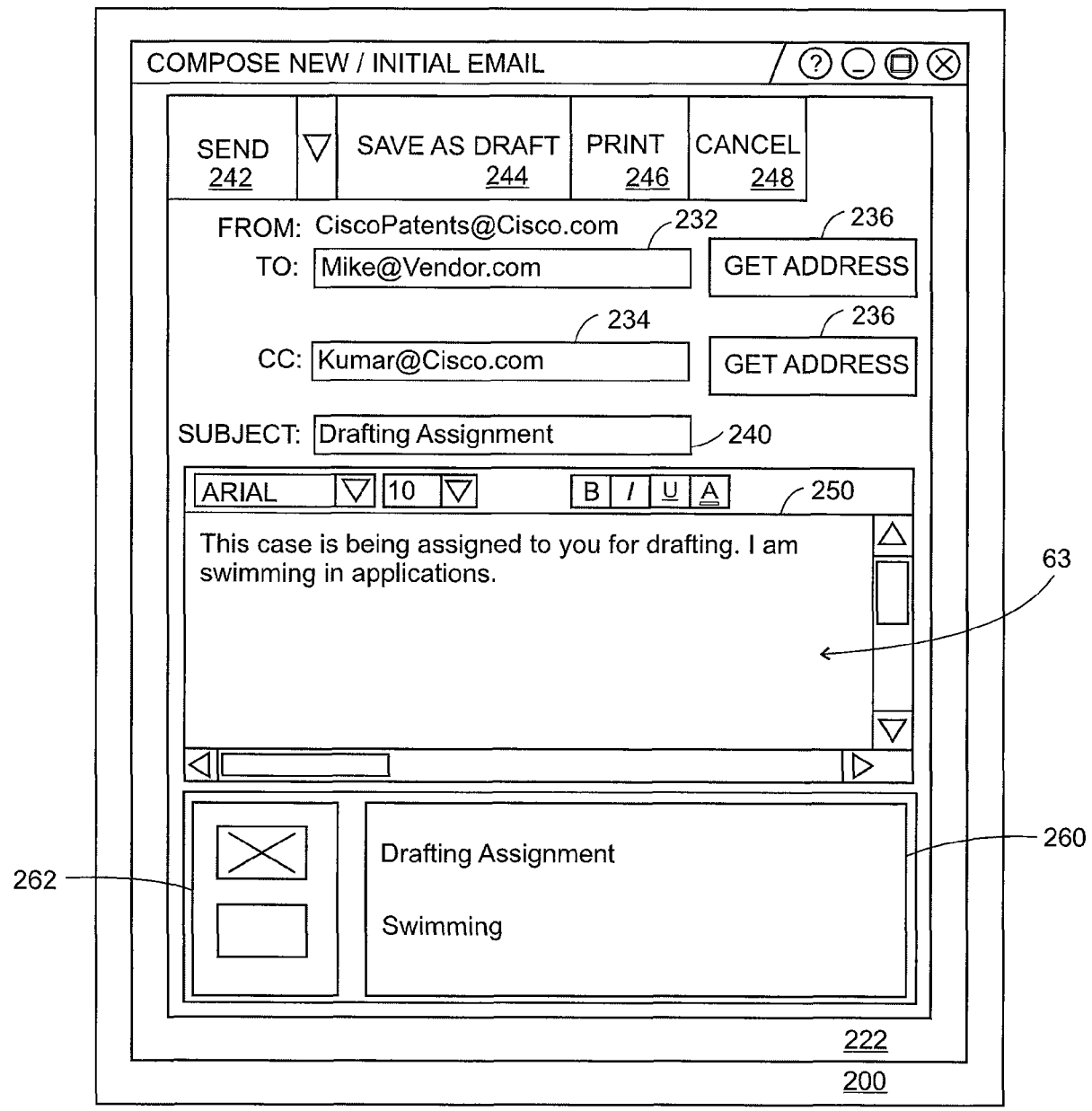
FIGS. 6A-6D are diagrams showing user interfaces having user-selectable options for including or excluding determined topics of email messages.
Figure 6B:
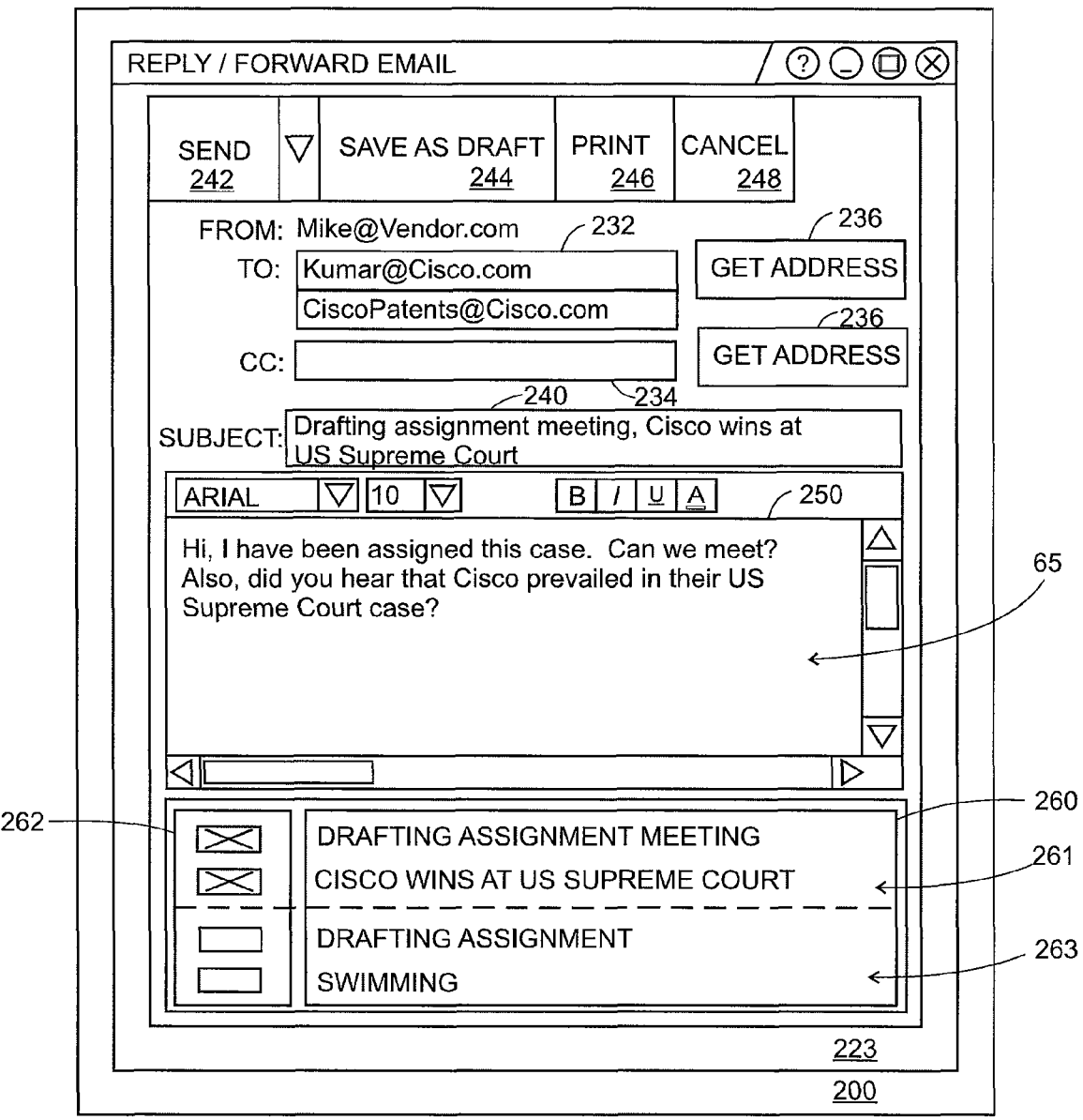
Figure 6C:
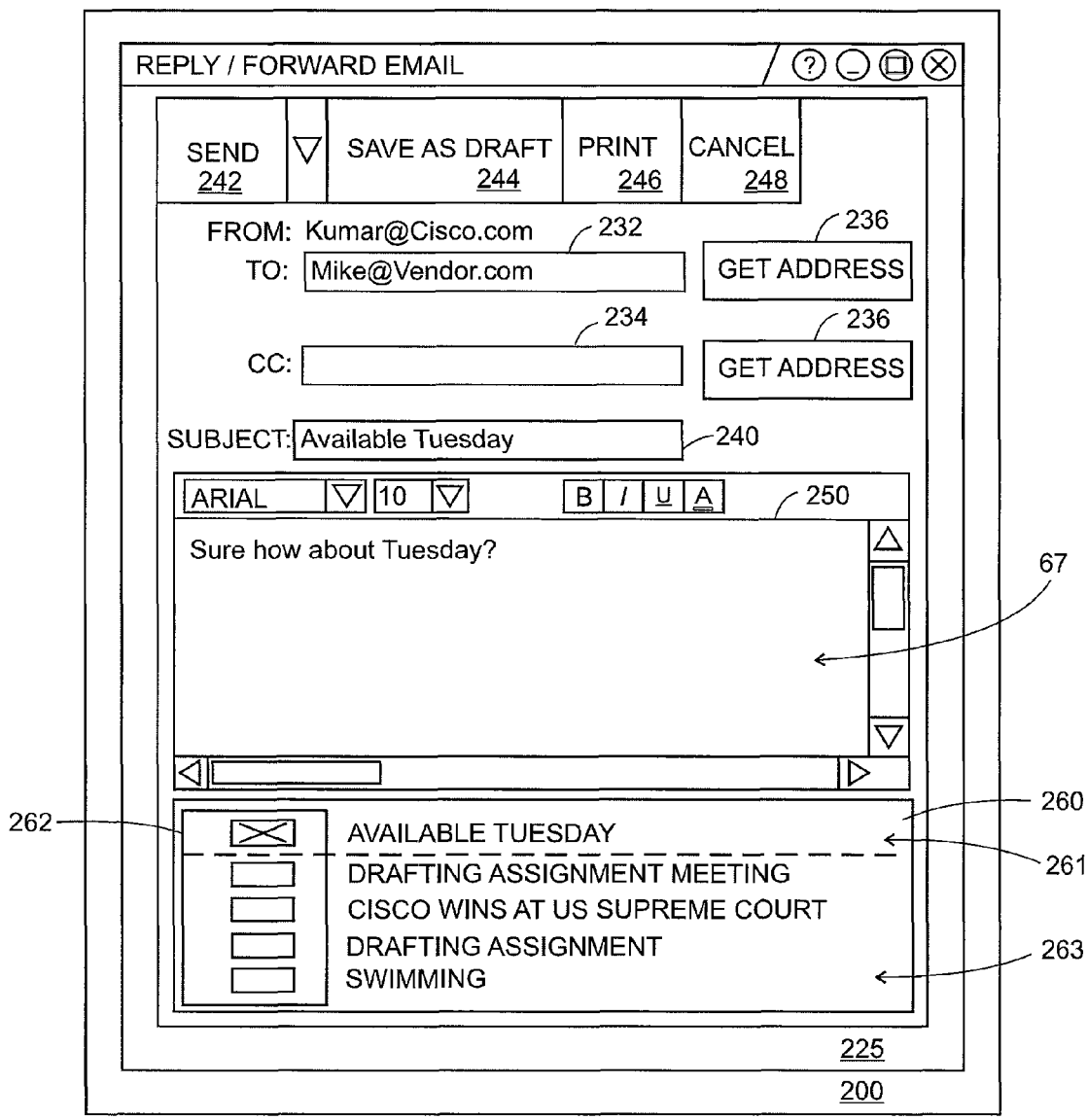

FIGS. 6A-6D are diagrams showing a user interface 200 provided by the example embodiment. Particularly, FIG. 6A is a diagram showing the user interface 200 on the display 38 of the workstation 22 at the first client computer 12 provided when the User1 composes the initial email message 63. FIG. 6B is a diagram showing the user interface on the display 38 of the workstation 26 at the third client computer 16 provided when the User3 composes the initial reply message 65. Lastly, FIG. 6C is a diagram showing the user interface on the display 38 of the workstation 24 at the second client computer 14 provided when the User2 composes the second reply email message 67.

With reference first to FIG. 6A, the user interface 200 includes an initial email composing window 222, which comprises a "To" recipient email address input box 232, in which the user may enter a direct forwardee recipient's email address, and a "Cc" recipient email address input box 234, in which the user may enter an indirect forwardee recipient's email address. The user interface 200 may include email address retrieval selection boxes 236 that, upon selection by the user, display a list of previously-stored email addresses, such as from an address book or other contact list, so that the user may select one of the displayed email addresses as the forwardee recipients' email addresses. Since similar email address retrieval selection functions are known in the art, or would be understood by those reasonably skilled in the art based on the present disclosure, further discussion of the email address retrieval selection function is omitted here. In the example illustrated, the direct "To" addressee is User3 Mike@Vendor.com, and the "Cc" addressee is User2 Kumar@Cisco.com.

In addition to the email address input boxes 232, 234, the user interface 200 also includes a Subject line input box 240 adapted to receive subject information. The box 240 permits a user to edit a subject or title of an email message. Preferably, in accordance with an example embodiment, the client email application 31 automatically provides a suggested Subject information based upon the text of the email using the methods and apparatus as described herein.

Additionally, the user interface 200 may comprise a send button 242, a save button 244, a print button 246, and a cancel button 248. The send button 242 is a user-selectable selection box, which is displayed at the user interface 200 and permits the user to send the email message to the selected forwardee recipient(s). Thus, when the user selects the send button 242, the email message on the user interface is sent to the forwardee recipient(s) as designated in the email address input boxes 232, 234. The save button 244 is a user-selectable selection box, which is displayed at the user interface 200 and permits the user to save the email message. Thus, when the user selects the save button 244, the email message is saved to a file or folder. The print button 246 is a user-selectable selection box, which is displayed at the user interface 200 and permits the user to print the email message. Thus, when the user selects the print button 246, the email message at the user interface 200 is printed to a local or network printer (not shown). The cancel button 248 is a user-selectable selection box, which permits the user to cancel the forwarding of the email message. Thus, when the user selects the cancel button 248, the email-composing window 222 is closed. Since the send, save, print, and cancel buttons are known in the art, further discussion of these various user items is omitted here.

The new email composing window 222 of the user interface 200 also includes a text window 250, in which the user may enter text as part of a new text message. Since the user interface 200 of FIG. 6A is configured for composing new or initial email messages, the text window 250 is initially blank or empty until data is inputted therein by the user. In the example embodiment illustrated, the User1 has entered the text "This case is being assigned to you for drafting. I am swimming in applications."

The user interface 200 of FIG. 6A also includes a suggested topic box 260 and a user-selectable check-box 262 on the email composing screen 222. The suggested topic box 260 is filled by the topic extractor 86 and string generator 88, based on the content information of the body portion of the email message contained in the text window 250. The check box 262 provides the user the option of incorporating the determined topic information of the newly-composed email message into the Subject line 240 of the header 72 (FIG. 3) of the composed message or the option of not including determined topic information of the email message in the Subject line. In one embodiment, the user-selectable check-box 262 is configured to toggle between a designation indicating inclusion of the detected topic information and a designation indicating omission of the detected topic information. In this regard, if the user selects the check-box 262 (e.g., clicks on the check-box using a mouse), then the check-box may toggle "on" to indicate that the detected topic information of the content information of the body portion will be included in the header of the email message when it is sent 110 (FIG. 5). If the user again selects the check-box 262 (e.g., clicks on the check-box a second time using the mouse), then the check-box may toggle "off" to indicate that the detected topic information of the body portion will not be included in the email message when sent. In an example embodiment, the check-box 262 may be checked on or off, depending on whether the user wishes to include the suggested topic information of the composed email message in the header or perhaps to compose a different topic for inclusion in the header. As shown in FIG. 6A, the user has selected the first user-selectable option 262, thereby indicating that the first topic detected in the newly composed email message 63, namely "Drafting assignment," is to be included in the header of the email message when sent. In addition, the user has not selected the second user-selectable option 262, thereby indicating that the second topic detected in the newly composed email message 63, namely "Swimming," is not to be included in the header of the email message when sent. The user may select one or all of the determined topics or may select neither topic and compose new subject text information.

With reference next to FIG. 6B, the user interface 200 includes a reply email composing window 223, which comprises a "To" recipient email address input box 232, in which the User3 may enter a direct forwardee recipient's email address, and a "Cc" recipient email address input box 234, in which the user may enter an indirect forwardee recipient's email address. The user interface 200 may include email address retrieval selection boxes 236 that, upon selection by the user, display a list of previously-stored email addresses, such as from an address book or other contact list, so that the user may select one of the displayed email addresses as the forwardee recipients' email addresses. Since similar email address retrieval selection functions are known in the art, or would be understood by those reasonably skilled in the art based on the present disclosure, further discussion of the email address retrieval selection function is omitted here. In the example illustrated, the direct "To" addressees are is User1 CiscoPatents@Cisco.com and User2 Kumar@Cisco.com.

In addition to the email address input boxes 232, 234, the user interface 200 also includes a Subject line input box 240 adapted to receive subject information. The box 240 permits a user to edit a subject or title of an email message. Preferably, in accordance with an example embodiment, the client email application 31 automatically provides a suggested Subject information based upon the text of the email, using the methods and apparatus as described herein.

Additionally, the reply email composing window 223 of the user interface 200 also includes a text window 250, in which the user may enter text as part of a new text message. Since the user interface 200 of FIG. 6B is configured for composing reply email messages, the text window 250 includes the text of the originally-received message that has been sent to the User3 and is being replied to or forwarded, as well as blank spaces in which additional data may be inputted by the User3. In the example embodiment illustrated, the User3 has entered the additional text data "Hi, I have been assigned this case, Can we meet? Also, did you hear that Cisco prevailed in their US Supreme Court case?"

In FIG. 6B, the suggested topic box 260 includes a current suggested topic box portion 261 filled by the topic extractor 86 and string generator 88, based on the content information of the body portion of the email message contained in the text window 250, and a historical suggested topic box portion 263 filled with previously-suggested topics in the email thread. The check box 262 provides the User3 the option of including the determined topic information of the newly-composed email message into the Subject line 240 of the header 72' (FIG. 3) of the reply message 65 or the option of not including determined topic information of the email message in the Subject line. As described above, in one embodiment, the user-selectable check-box 262 is configured to toggle between a designation indicating inclusion of the detected topic information and a designation indicating omission of the detected topic information. In the example embodiment shown in FIG. 6B, topic extractor 86 found a pair of topics and has offered both in the suggested topic box 260, namely "Drafting assignment meeting" and "Cisco wins at US Supreme Court." Preferably, as shown, the reply email 223 includes a user-selectable check-box 262 for all of the new topics determined. The User3 has selected both of the user-selectable options, thereby indicating that the topics detected in the reply email message 65, namely "Drafting assignment meeting" and "Cisco wins at US Supreme Court," are to be included in the header of the email message when sent. The residual or historical topics "Drafting assignment" and "Swimming" are not included, because the user has not selected the third or fourth check boxes as illustrated.

With reference next to FIG. 6C, the user interface 200 includes a further reply email composing window 225 that comprises a "To" recipient email address input box 232, in which the user may enter a direct forwardee recipient's email address, and a "Cc" recipient email address input box 234, in which the user may enter an indirect forwardee recipient's email address. The user interface 200 may include email address retrieval selection boxes 236 that, upon selection by the user, display a list of previously-stored email addresses, such as from an address book or other contact list, so that the user may select one of the displayed email addresses as the forwardee recipients' email addresses. Since similar email address retrieval selection functions are known in the art, or would be understood by those reasonably skilled in the art based on the present disclosure, further discussion of the email address retrieval selection function is omitted here. In the example illustrated, the direct "To" addressee is User3 Mike@Vendor.com and there are no "Cc" addressees. Thus, the User2 Kumar@Cisco.com is not included in the reply email message 67.

In addition to the email address input boxes 232, 234, the user interface 200 also includes a Subject line input box 240 adapted to receive subject information. The box 240 permits a user to edit a subject or title of an email message. Preferably, in accordance with an example embodiment, the client email application 31 automatically provides a suggested Subject information based upon the text of the email using the methods and apparatus as described herein.

Additionally, the reply email composing window 225 of the user interface 200 also includes a text window 250, in which the user may enter text as part of a new text message. Since the user interface 200 of FIG. 6C is configured for composing forward or reply email messages, the text window 250 includes the text of the originally-received messages that have been sent along in the thread to User2 and are being replied to or forwarded, as well as blank or empty spaces in which additional data may be inputted by User2. In the example embodiment illustrated, User2 has entered the text "Sure how about Tuesday?"

In FIG. 6C, the current suggested topic portion 261 of the suggested topic box 160 is filled by the topic extractor 86 based on the content information of the body portion of the email message contained in the text window 250. The check box 262 provides the user the option of including the determined topic information of the newly-composed email message into the Subject line 240 of the header 72 (FIG. 3) of the composed message or the option of not including the determined topic information of the email message in the Subject line. As described above, in one embodiment, the user-selectable check-box 262 is configured to toggle between a designation indicating inclusion of the detected topic information and a designation indicating omission of the detected topic information. In the example embodiment, as shown in FIG. 6C, topic extractor 86 found a set of five (5) topics and has offered all five (5) in the suggested topic box 160, namely "Swimming," "Drafting assignment," "Cisco wins at US Supreme Court," "Drafting Assignment Meeting," and "Available Tuesday." Preferably, as shown, the reply email window 225 includes a set of user-selectable check-boxes 262 for each of the topics determined. The User2 has selected only the top check box, as illustrated, thereby indicating that the topic detected in the reply email message 65, namely "Available Tuesday," is to be included in the header of the email message 67 when sent.

Figure 6D:
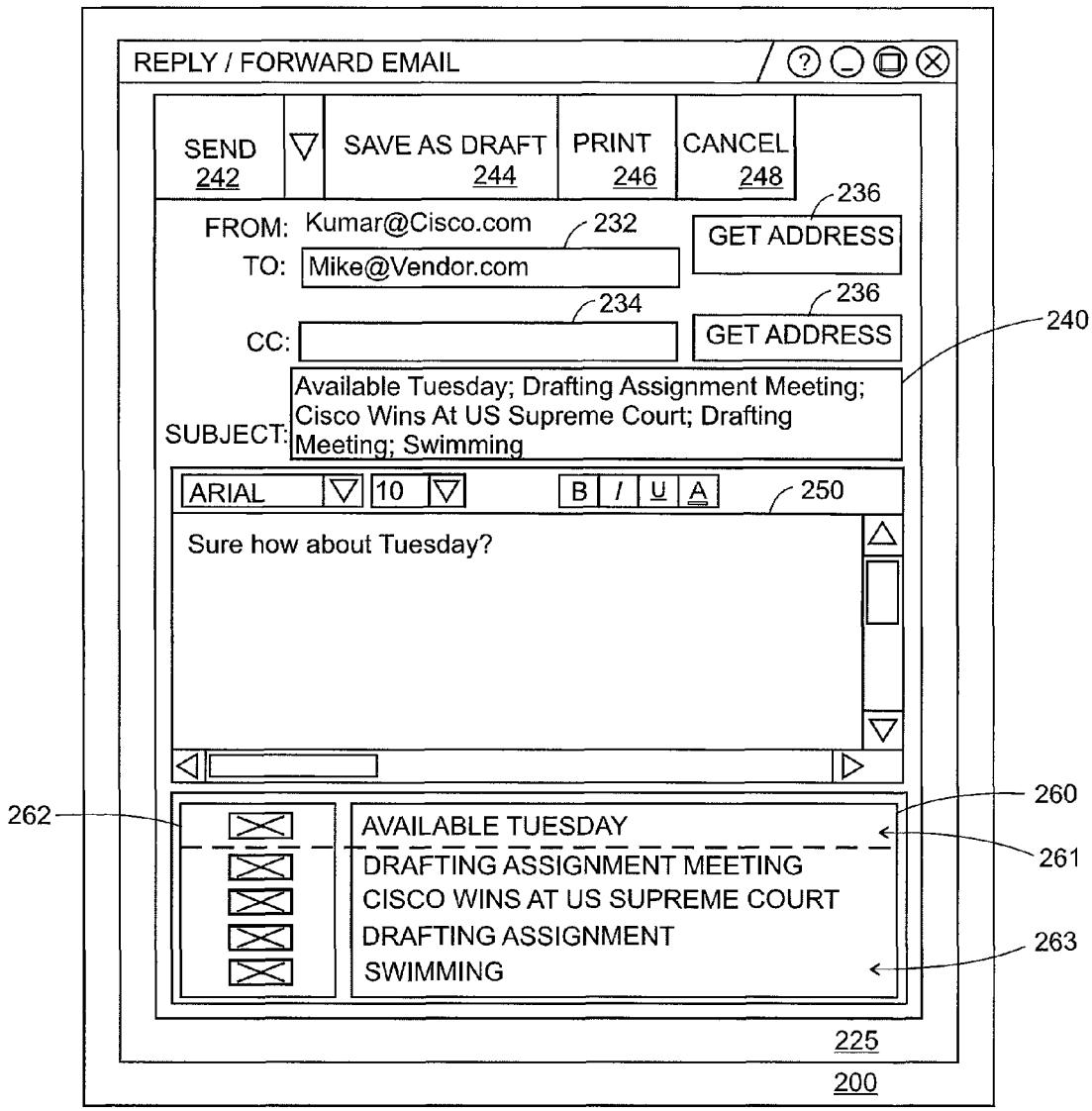

With reference next to FIG. 6D, in another example embodiment, only the suggested topic determined from the email message being composed is selectable. The historical topics determined are not removable by the users of the system until or unless the email messages generating those topic suggestions are removed from the thread. As illustrated, the historical topics "Swimming," "Drafting Assignment," "Cisco wins at US Supreme Court," and "Drafting Assignment Meeting" are not removable by the user and, thus, are automatically inserted into the Subject line input box 240 by the system.

In the example illustrated, the user may avoid the topics "Swimming" and "Drafting Assignment" from being automatically inserted into the Subject line input box 240 by canceling the first part 62 of the thread 60, such as by deleting the first email message 63 from the thread. In that case, only the topics "Cisco wins at US Supreme Court" and "Drafting Assignment Meeting" would be automatically inserted into the Subject line input box 240 by the system. Further, the user may avoid the topics "Cisco wins at US Supreme Court" and "Drafting Assignment Meeting" from being automatically inserted into the Subject line input box 240 by canceling the first and second parts 62, 64 of the thread 60, such as by deleting the second and third email messages 65, 63 from the thread. In that case, only the currently suggested topic "Available Tuesday" would be selectively inserted into the Subject line input box 240 by the system based upon the condition of the check box 262.

What has been described above includes example implementations. It is, of course, not possible to describe every conceivable combination of components or methodologies for purposes of describing the various embodiments, but one of ordinary skill in the art will recognize that many further combinations and permutations are possible. Accordingly, the scope of the appended claims interpreted in accordance with the breadth to which they are fairly, legally, and equitably entitled include all such equivalents, alterations, modifications, and variations.

The invention claimed is:

1. An apparatus for automated generation of subject line content for multi-field e-mail messages having a body field and a subject line field holding the subject line content summarizing text-based data in the body field, the apparatus comprising:
  an input operable to receive content data including text-based information corresponding to a body of an originally received e-mail message and a newly composed e-mail message responsive to the originally received e-mail message;
  a memory configured to store the content data;
  a text analyzer including logic operable to analyze received content data;
  a topic extractor including logic operable to extract topic data in accordance with an output of the text analyzer;
  a string generator including logic operable to generate subject line data in accordance with the topic data extracted by the topic extractor; and
  a message output operable to output a multi-field e-mail message having a body field inclusive of the content data received by the input and a subject line field inclusive of the subject line data generated by the string generator;
  wherein the subject line field contains aggregated summaries of a body field of the originally received e-mail message and of a body field of the newly composed e-mail message.

2. The apparatus of claim 1 further comprising:
  a prompt generator operable to generate a prompt inclusive of the extracted topic data to an associated user;
  a selector operable to receive, from the associated user, confirmation data corresponding to acceptability of the extracted topic data; and wherein
  the string generator further includes logic operable to generate the subject line data in accordance with received confirmation data.

3. The apparatus of claim 2 wherein:
  the string generator further includes logic operable to generate a plurality of alternative subject lines in accordance with the output of the topic extractor;
  the prompt generator is further operable to generate the prompt inclusive of data corresponding to each of the plurality of alternative subject lines;
  the selector is further operable to receive from the associated user, selection data corresponding to a selected one of the alternative subject lines; and
  the string generator further includes logic operable to generate the subject line data in accordance with received selection data.

4. The apparatus of claim 3 wherein the content data further includes prior e-mail data corresponding to at least one prior e-mail, and wherein the text analyzer includes logic operable to analyze the prior e-mail data.

5. The apparatus of claim 4 further comprising:
  the topic extractor further including logic operable to extract body topic data corresponding to the e-mail body and prior e-mail topic data corresponding to the at least one prior e-mail;
  test logic operable to test the body topic data relative to prior e-mail topic data; and the string generator further inclusive of logic to alter the subject line data in accordance with an output of the test logic.

6. The apparatus of claim 5 wherein the altered subject line data includes link data corresponding to the at least one prior e-mail.

7. A computer-implemented method in an associated electronic messaging system for automated generation of subject line content for multi-field e-mail messages communicated between a plurality of workstations of the associated electronic messaging system, the method comprising:
receiving content data including text-based information corresponding to a body of an originally received e-mail message and a newly composed e-mail message responsive to the originally received e-mail message;
analyzing the received content data;
extracting topic data in accordance with an output of the analyzing step;
generating subject line data in accordance with the topic data extracted in the extracting step; and
outputting a multi-field e-mail message having a body field inclusive of the content data received during the receiving and a subject line field inclusive of the subject line data generated in the generating step;
wherein the subject line field contains aggregated summaries of a body field of the originally received e-mail message and of a body field of the newly composed e-mail message.

8. The method of claim 7 further comprising the steps of:
generating a prompt inclusive of the extracted topic data to an associated user;
for receiving, from the associated user, confirmation data corresponding to acceptability of the extracted topic data; and
generating the subject line data in accordance with received confirmation data.

9. The method of claim 8 wherein:
a plurality of alternative subject lines are generated in accordance with the output of the extraction step;
the prompt inclusive is generated of data corresponding to each of the plurality of alternative subject lines;
selection data is received from the user corresponding to a selected one of the alternative subject lines; and
the subject line data is generated in accordance with received selection data.

10. The method of claim 9 wherein the content data further includes prior e-mail data corresponding to at least one prior e-mail, and wherein the analyzing step further includes analyzing the prior e-mail data.

11. The method of claim 10 further comprising the steps of:
extracting body topic data corresponding to the e-mail body and prior e-mail topic data corresponding to the at least one prior e-mail;
testing body topic data relative to prior e-mail topic data; and
altering the subject line data in accordance with an output of the testing means.

12. The method of claim 11 wherein the altered subject line data includes link data corresponding to the at least one prior e-mail.

13. A system for automated generation of subject line content for multi-field e-mail messages, the system comprising:
means for receiving content data including text-based information corresponding to a body of an originally received e-mail message and a newly composed e-mail message responsive to the originally received e-mail message;
means for storing the content data;
means for analyzing received content data;
means for extracting topic data in accordance with an output of the analyzing means;
means for generating subject line data in accordance with the topic data extracted by the means for extracting; and
means for outputting a multi-field e-mail message having a body field inclusive of the content data and a subject line field inclusive of the subject line data generated by the means for generating;
wherein the subject line field contains aggregated summaries of a body field of the originally received e-mail message and of a body field of the newly composed e-mail message.

14. The system of claim 13 further comprising:
means for generating a prompt inclusive of the extracted topic data to an associated user;
means for receiving, from the associated user, confirmation data corresponding to acceptability of the extracted topic data; and wherein
the means for generating subject line data includes means for generating the subject line data in accordance with received confirmation data.

15. The system of claim 14 wherein:
the means for generating subject line data includes means for generating a plurality of alternative subject lines in accordance with the output of the extraction means;
the means for generating a prompt includes means for generating the prompt inclusive of data corresponding to each of the plurality of alternative subject lines;
the means for receiving includes means for receiving, from the associated user, selection data corresponding to a selected one of the alternative subject lines; and
the means for generating subject line data includes means for generating the subject line data in accordance with received selection data.

16. The system of claim 15 wherein the content data further includes prior e-mail data corresponding to at least one prior e-mail, and wherein the means for analyzing further includes means for analyzing the prior e-mail data.

17. The system of claim 16 further comprising:
means for extracting body topic data corresponding to the e-mail body and prior e-mail topic data corresponding to the at least one prior e-mail;
means for testing body topic data relative to prior e-mail topic data; and
the means for generating subject line data further including means for altering the subject line data in accordance with an output of the means for testing.

18. The system of claim 17 wherein the means for altering includes means for altering the subject line data to include link data corresponding to the at least one prior e-mail.

19. Logic encoded in one or more tangible non-transient computer readable medium of a computer system for execution by one or more processors of the computer system to automatically generate subject line content for multi-field e-mail messages, the logic encoded in the one or more tangible non-transient computer medium, when executed by the one or more processors of the computer system being operable to:
receive content data including text-based information corresponding to a body of an originally received e-mail message and a newly composed e-mail message responsive to the originally received e-mail message;

store the content data in a memory of the computer system;
analyze the received content data;
extract topic data as extracted topic data in accordance with an output of the analyzing step;
generate subject line data as generated subject line data in accordance with the extracted topic data; and
output a multi-field e-mail message having a body field inclusive of the content data and a subject line field inclusive of the generated subject line data;
wherein the subject line field contains aggregated summaries of a body field of the originally received e-mail message and of a body field of the newly composed e-mail message.

20. The logic according to claim 19 when executed by the one or more processors of the computer system further being operable to:
generate a prompt inclusive of the extracted topic data to an associated user;
receive, from the associated user, confirmation data corresponding to acceptability of the extracted topic data; and,
generate the subject line data in accordance with received confirmation data.

\* \* \* \* \*